US010673353B2

(12) United States Patent
Drofenik et al.

(10) Patent No.: US 10,673,353 B2
(45) Date of Patent: Jun. 2, 2020

(54) CONVERTER CELL WITH INTEGRATED PHOTOVOLTAIC CELL

(71) Applicant: ABB Schweiz AG, Baden (CH)

(72) Inventors: Uwe Drofenik, Zürich (CH); Franziska Brem, Küsnacht (CH); Francisco Canales, Baden-Dättwil (CH)

(73) Assignee: ABB Schweiz AG, Baden (CH)

( * ) Notice: Subject to any disclaimer, the term of this patent is extended or adjusted under 35 U.S.C. 154(b) by 145 days.

(21) Appl. No.: 15/993,019

(22) Filed: May 30, 2018

(65) Prior Publication Data

US 2018/0351474 A1 Dec. 6, 2018

(30) Foreign Application Priority Data

May 30, 2017 (LU) .................................. 100268

(51) Int. Cl.
*H02M 7/5387* (2007.01)
*H02J 7/00* (2006.01)
*H02M 1/36* (2007.01)
*H02M 7/483* (2007.01)
*H02M 1/32* (2007.01)
(Continued)

(52) U.S. Cl.
CPC ......... *H02M 7/5387* (2013.01); *H02J 7/0068* (2013.01); *H02J 7/35* (2013.01); *H02M 1/32* (2013.01); *H02M 1/36* (2013.01); *H02M 7/483* (2013.01); *H02S 40/32* (2014.12); *H02S 40/38* (2014.12); *H02J 3/383* (2013.01);
(Continued)

(58) Field of Classification Search
CPC ........ H02M 7/5387; H02M 1/32; H02M 1/36; H02M 7/483; H02M 1/00; H02M 2001/0006; H02M 2007/4835; H02S 40/32; H02S 40/38; H02J 7/0068; H02J 7/35; H02J 3/383; H02J 7/345; H02J 7/00; H02J 7/34
See application file for complete search history.

(56) References Cited

U.S. PATENT DOCUMENTS

2014/0003099 A1 1/2014 Dillig et al.
2014/0097804 A1 4/2014 Hasler
2017/0346407 A1 11/2017 Kim et al.

FOREIGN PATENT DOCUMENTS

CN 104914290 A 9/2015
DE 2631194 A1 2/1978
(Continued)

OTHER PUBLICATIONS

Han et al., "A 4000V Input Auxiliary Power Supply with Series Connected SiC MOSFETs for MMC-based HVDC System," 2016 IEEE 8th International Power Electronics and Motion Control Conference (IPEMC-ECCE Asia), 6 pp.
(Continued)

*Primary Examiner* — Robert L Deberadinis
(74) *Attorney, Agent, or Firm* — Taft Stettinius & Hollister LLP; J. Bruce Schelkopf (57) ABSTRACT

A converter cell for a modular converter includes at least one power semiconductor switch for switching a cell current through the converter cell; a cell capacitor interconnected with the at least one power semiconductor switch, such that the cell capacitor is loadable by the cell current; a controller for switching the at least one power semiconductor switch, wherein the controller is supplyable with auxiliary power from the cell capacitor; and a photovoltaic cell for providing initial and/or further auxiliary power to the controller.

20 Claims, 3 Drawing Sheets

(51) Int. Cl.
- *H02S 40/32* (2014.01)
- *H02S 40/38* (2014.01)
- *H02J 7/35* (2006.01)
- *H02M 1/00* (2006.01)
- *H02J 3/38* (2006.01)
- *H02J 7/34* (2006.01)

(52) U.S. Cl.
CPC ...... *H02J 7/345* (2013.01); *H02M 2001/0006* (2013.01); *H02M 2007/4835* (2013.01)

(56) References Cited

FOREIGN PATENT DOCUMENTS

| | | |
|---|---|---|
| EP | 2549634 A1 | 1/2013 |
| EP | 2993775 A1 | 3/2016 |
| WO | 9829927 A2 | 7/1998 |
| WO | 0037953 A1 | 6/2000 |
| WO | 2015155112 A1 | 10/2015 |
| WO | 2016108552 A1 | 7/2016 |
| WO | 2016173825 A1 | 11/2016 |
| WO | 2018197363 A1 | 11/2018 |

OTHER PUBLICATIONS

Heldwein et al., "A Novel SiC J-FET Gate Drive Circuit for Sparse Matrix Converter Applications," 19th Annual IEEE Applied Power Electronics Conference and Exposition, 2004, Anaheim, California, pp. 116-121.

Jäger et al., "Pre-charging of MMC and power-up of a MMC-based multiterminal HVDC transmission," 10.1109/OPTIM.2015.7426981, (2015), pp. 369-374.

Li et al., "Closed-Loop Precharge Control of Modular Multilevel Converters During Start-Up Processes," IEEE Transactions on Power Electronics, vol. 30, No. 2, Feb. 2015, pp. 524-531.

Tian et al., "A Simple and Cost-effective Precharge Method for Modular Multilevel Converters by Using a Low-Voltage DC Source," IEEE Transactions on Power Electronics, vol. 31, No. 7, Jul. 2016, pp. 5321-5329.

Panasonic, Lithium Ion NCR18650B, Product Brochure, http://na.industrial.panasonic.com/sites/default/pidsa/files/ncr18650b.pdf.

Shahan, "Which Solar Panels Are Most Efficient," Clean Technica, retrieved from Internet: https://cleantechnica.com/2014/02/02/which-solar-panels-most-efficient/.

"Concentrator photovoltaics," Wikipedia, Retrieved May 3, 3019 from Internet: https://en.wikipedia.org/Concentrator_photovoltaics.

"Lumen (unit)," Wikipedia, Retrieved May 3, 3019 from Internet: https://en.wikipedia.org/Lumen_(unit).

"Solar cell," Wikipedia, Retrieved May 3, 3019 from Internet: https://en.wikipedia.org/Solar_cell.

"Supercapacitor," Wikipedia, Retrieved May 3, 3019 from Internet: https://en.wikipedia.org/Supercapacitor.

"Electrolytic capacitor," Wikiwand, Retrieved May 3, 3019 from Internet: https://www.wikiwand.com/en/Electrolytic_capacitor.

WIMA, Double-Layer Capacitors in Rectangular Metal Case with very High Capacitances in the Farad Range, WIMA SuperCap R, Product Brochure, http://wima.cn/DE/supercap_r_1.htm, Mar. 5, 2019.

Luxembourg Patent Office, Search Report issued in corresponding Application No. LU100268, dated Mar. 13, 2018, 8 pp.

Peftitsis et al., "Auxiliary Power Supply for Medium-Voltage Modular Multilevel Converters," 2015 17th European Conference on Power Electronics and Applications, Sep. 8, 2015, 11 pp.

Takasaki et al., "Wireless Power Transfer System for Gate Power Supplies of Modular Multilevel Converters," 2016 IEEE 8th International Power Electronics and Motion Control Conference, (IPEMC-ECCE Asia), May 22, 2016, 8 pp.

1
CONVERTER CELL WITH INTEGRATED PHOTOVOLTAIC CELL

FIELD OF THE INVENTION

The invention relates to a converter cell for a modular converter, a modular converter and a method for operating the modular converter.

BACKGROUND OF THE INVENTION

Electrical converters with multiple stacked converter cells, such as modular multi-level converters, usually require auxiliary power for the individual converter cells to supply control electronics, signal processing, sensors and gate drivers. This auxiliary power is usually drawn locally from a main cell capacitor of the respective converter cell, which may simplify the system design significantly. Otherwise, each converter cell has to be supplied with auxiliary power from an additional DC/DC converter, which has to provide full voltage insulation, which may be up to several 100 kV in case of HVDC (high voltage DC) applications. This would result in a significant increase of complexity, insulation issues and cost.

Start-up of such converters may be performed in a way that the cell capacitors are loaded in a first step. At this stage, the converter may work as a simple passive diode bridge, and the inrushing current may have to be limited by resistors which are disconnected after a DC link is charged. After this first step, the cell capacitors may be charged sufficiently in order to start up the auxiliary power supply of the converter cell, thus supplying control electronics, sensors and gate drivers. In the following second step, the control electronics may start generating gate signals and may activate the semiconductor switches of the converter cell in order to boost the DC link in a controlled way to the DC link voltage required for nominal operation. After starting up the auxiliaries, it is also possible to monitor the cell states, for example with sensors for voltage, current, temperature, etc.

However, the described procedure may not work when the semiconductor switches are normally-on switches like SiC-JFETs (junction gate field-effect transistors). In the case that such semiconductor switches do not receive a gate voltage signal, they are in on-state and short the DC link. Therefore, the cell capacitors of the individual converter cells have to be pre-charged or a mechanism to power the gate driver has to be provided before connecting to the grid in order to allow the normally-on switches to be in a controlled off-state for the short time during the first stage of starting up the converter.

Furthermore, at commissioning of a converter, it would be of advantage to check if all converter cells operate as planned, for example that all signals are working correctly, pulse width modulation signals are available, no signal connection is broken, all communication interfaces are operational, etc., before connecting the converter to an electrical grid and starting the converter up. This may be only possible if all converter cells can be energized externally, not directly from the electrical grid, which may be a high voltage grid providing more than 100 kV. In such cases it may be sufficient to provide a relatively small voltage (such as 24 V per cell) for starting up the converter cells.

For pre-charging converter cells, there are several technical solutions.

Batteries may be employed during the converter start up. This, however, requires a large number of batteries, for 2
example at least one battery for each cell, and may result in a labor-intensive maintenance effort.

Another possibility is inductive power transfer. However, inductive power transfer may require a major redesign of the converter, because mechanically complex secondary coils may have to be integrated in each converter cell. Also, the converter cells may have to provide accessible space for placing primary coils. Furthermore, the devices for inductive power transfer may have to be designed for very high voltage. Placing them next to the converter cells may require a redesign of the insulation concept of the converter.

Also, electrical connections with switches and/or cabling, which has to be removed out of the insulation spaces before starting up, may be used to power up each converter cell. However, this usually results in a high maintenance effort, a possible redesign of the converter and/or the hall the converter is arranged, and may be labor-intensive, in particular, when there is a large number of converter cells.

WO 2016 108 552 A1 shows a power control apparatus for a submodule of a modular multi-level converter. The auxiliary power of the converter cells is provided by loading of the cell capacitor during the first step of the start-up of the converter.

DESCRIPTION OF THE INVENTION

It is an objective of the invention to provide a simple and economic way to supply auxiliary power to a converter cell of a modular converter, in particular in the case, when a cell capacitor of the converter cell is not yet loaded.

This objective is achieved by the subject-matter of the independent claims. Further exemplary embodiments are evident from the dependent claims and the following description.

A first aspect of the invention relates to a converter cell for a modular converter. A converter cell may be any device composed of one or more power semiconductor switches, their electrical and mechanical interconnections and optionally a housing for these components. The term "power" here and in the following may refer to converter cells and/or semiconductor switches adapted for processing current of more than 100 V and/or more than 10 A. A modular converter may be composed of a plurality of such converter cells, which may be seen as modules of the converter. The converter cells may be connected in series to switch high voltages, such as 100 kV and more.

According to an embodiment of the invention, the converter cell comprises at least one power semiconductor switch for switching a cell current through the converter cell, a cell capacitor interconnected with the at least one power semiconductor switch, such that the cell capacitor is loadable by the cell current and a controller for switching the at least one power semiconductor switch, wherein the controller is supplyable with auxiliary power from the cell capacitor.

Each power semiconductor switch may be provided as a semiconductor chip. A semiconductor switch may be a transistor or thyristor. The one or more power semiconductor switches may be switched in such a way, that inputs of the converter cells are short-circuited or are interconnected with the cell capacitor. The gate signals for this switching may be provided by the controller, which may be interconnected with the central controller of the modular converter. The controller may comprise control electronics, signal processing, sensors and/or gate drivers for the power semiconductor switches. Furthermore, in normal operation of the modular converter, the controller may be supplied with auxiliary power from the cell capacitor. It has to be noted, that the controller may be on the potential of the converter during normal operation of the converter. Such a potential may be 100 kV or more with respect to ground.

Furthermore, the converter cell comprises a photovoltaic cell for providing initial and/or further auxiliary power to the controller. A photovoltaic cell may be a device that is adapted for converting light being radiated onto the photovoltaic cell into a voltage that may be used for supplying the controller. In such a way, a wireless power transfer may be provided for the converter cell. For example, artificial light sources may be used to radiate light onto the photovoltaic cell, which may be attached to the converter cell. The proposed solution is simple and of low complexity, is low-cost, comes with no additional maintenance effort, and does not require a major redesign of the insulation distances, of the modular converter and/or the building or hall, in which the modular converter is arranged.

According to an embodiment of the invention, during operation of the converter cell, the photovoltaic cell is on an electric potential of the converter cell. For example, the photovoltaic cell may be mechanically connected to the converter cell, for example to its housing. No electrical insulation for the photovoltaic cell is necessary, which isolates the photovoltaic cell to ground.

According to an embodiment of the invention, the converter cell further comprises an auxiliary power capacitor for storing auxiliary power for the controller and for receiving auxiliary power from the cell capacitor and the photovoltaic cell. The auxiliary power capacitor may have a lower voltage rating as the cell capacitor. For example, the auxiliary power capacitor may be a component of the controller. During normal operation, the auxiliary power capacitor may be charged from the cell capacitor. Otherwise, for example when the cell capacitor is not charged, the auxiliary power capacitor may be charged from the photovoltaic cell.

According to an embodiment of the invention, the converter cell further comprises a DC/DC converter for converting a cell capacitor voltage of the cell capacitor into a supply voltage for the controller. For example, the DC/DC converter may be adapted for converting the cell voltage, which may be 1 kV and more to an auxiliary voltage for the controller, such as 24 V. Also the photovoltaic cell may produce a much lower voltage as the cell capacitor voltage. During nominal operation of the modular converter, the DC/DC converter may be used for generating the auxiliary voltage for the controller and/or for charging the auxiliary power capacitor.

According to an embodiment of the invention, the DC/DC converter is adapted for converting a voltage from the photovoltaic cell into a voltage supplied to the cell capacitor. The DC/DC converter also may be used for charging the cell capacitor with the voltage from the photovoltaic cell. For example, doing commissioning and or maintenance, the proper operation of the modular converter may be tested in this way.

According to an embodiment of the invention, the at least one power semiconductor switch is a normally-on switch. A normally-on semiconductor switch may be a semiconductor switch, which is conducting or is turned on, when no gate signal or a gate signal of substantially 0 V is applied to its gate. A normally-on semiconductor switch becomes blocking or is turned off, when a voltage different from 0 is applied to its gate. For example, a normally-on semiconductor switch may be a JFET, i.e. junction gate field-effect transistor. Contrary to this, a normally-off semiconductor switch may be a semiconductor switch, which is blocking or is turned off, when no gate signal or a gate signal of substantially 0 V is applied to its gate.

Employing JFETs in the modular converter may allow a short circuit failure mode of the converter cells without arc and/or melting processes, since this type of semiconductor switches usually may become conducting during a failure.

When the converter cell is provided with normally-on switches, it may be necessary, that the converter cells are pre-charged during start-up of the modular converter, since the controller needs auxiliary power to turn the normally-on switches off and thus to interconnect the inputs of the converter cell with the cell capacitor. Such a pre-charging may be performed in a very simple and economical way described herein.

According to an embodiment of the invention, the at least one power semiconductor switch is a normally-off switch. However, it has to be noted that such a pre-charging also may be beneficial with normally-off switches, such as IGBTs, MOSFETs, IGCT, etc.

According to an embodiment of the invention, the at least one power semiconductor switch is based on a wide bandgap substrate. Such power semiconductor switches may have rather high voltage ratings such as above 1 kV. For example, a wide bandgap substrate may be SiC, GaAs, etc.

A further aspect of the invention relates to a modular converter. As already mentioned, the modular converter may be a modular multi-level converter. In particular, the modular converter may be of voltage-source type. The modular converter may be employed in high voltage DC applications, for example for switching voltages of more than 100 kV.

According to an embodiment of the invention, the modular converter comprises a plurality of converter cells according to one of the previous claims connected in series, and at least one light source, which is galvanically separated from the converter cells and which is adapted for radiating light on one or more of the photovoltaic cells of the converter cells. For example, the one or more light sources, which may be lamps, may be installed remote from the series-connected converter cells. The converter cells may be assembled into stacks which are arranged in an isolated portion of the building or hall accommodating the modular converter. The one or more light sources may be arranged inside this building or hall inner portion that need not be isolated.

According to an embodiment of the invention, the modular converter further comprises a plurality of light sources, wherein every light source is associated with one or more photovoltaic cells. For example, there may be a light source for every converter cell. It also may be possible that one light source is used for radiating light onto the photovoltaic cells of two or more converter cells. In these cases, it may be possible, that the light source is unmovable, i.e. always directed in the same direction.

According to an embodiment of the invention, the at least one light source comprises a laser. A laser may increase the efficiency of the wireless power transfer, since light with only one wavelength may be generated and photovoltaic cells usually are only very efficient in a small wavelength band.

According to an embodiment of the invention, the modular converter further comprises at least one movable light source, such that converter cells and/or groups of converter cells are supplyable sequentially with the at least one movable light source. For example, a light source may comprise a controllable actuator which is adapted for directing the light source towards different photovoltaic cells and/or converter cells. In particular, a laser may be provided with the mirror system adapted for directing the laser beam into different directions. Movable motion-controlled light sources, which pre-charge converter cells or converter cell groups sequentially (one after the next), may reduce the number of light sources.

A further aspect of the invention relates to a method for operating a modular converter as described in the above and in the following. It has to be understood that features of the method as described in the above and in the following may be features of the modular converter as described in the above and in the following, and vice versa. The method may be performed automatically by a central controller of the modular converter optionally together with the cell controllers of the converter cells.

According to an embodiment of the invention, the method comprises: radiating light on photovoltaic cells of the converter cells; and supplying the controllers of the converter cells with a voltage from the photovoltaic cells. Whenever an auxiliary power supply for one or more converter cells is needed, the light sources may be turned on, for example automatically under the control of the central controller. Furthermore, the respective photovoltaic cell may be electrically interconnected with the cell controller that a voltage generated by the photovoltaic cell is always supplied to the cell controller and/or the auxiliary power capacitor.

It also may be possible that an auxiliary power capacitor and/or the cell capacitor are pre-charged with the voltage from the photovoltaic cell. For example, the DC/DC converter may charge the cell capacitor with the voltage from the photovoltaic cell. It has to be noted, that such a charging may be performed for different times dependent on the amount of energy needed in the respective capacitor. For example, for start-up procedure, the auxiliary power capacitors may be charged from the photovoltaic cells for some seconds, for example less than 10 seconds. For commissioning or a test of the converter, when the converter is not connected to a high voltage grid, the cell capacitors may be charged from the photovoltaic cells for several hours, such as five hours or more.

The method may be employed during start-up of the modular converter. The start-up of the modular converter may be the phase, when the converter cells need to be supplied with auxiliary power for switching the at least one power semiconductor switch, but when the cell capacitor is not yet charged.

According to an embodiment of the invention, when the at least one semiconductor switch of the plurality of converter cells is a normally-on switch, the method further comprises: radiating light on the photovoltaic cells during a start-up of the converter; and switching the normally-on switches into a blocking state with the controller, which is supplied by the photovoltaic cell.

In case of a modular converter with normally-on semiconductor switches like JFETs, the normally-on semiconductor switches usually need to be operated already before connecting the modular converter to an electrical grid. Otherwise, the normally-on semiconductor switches may short-circuit the DC link and/or the cell capacitors at the very beginning and, besides shorting the grid, would prevent powering-up the controllers. Therefore, an energy storage, such as the auxiliary power capacitor, needs to be pre-charged or at least partly pre-charged before connecting the modular converter to the electrical grid. The voltage from the photovoltaic cell may be used for supplying the controller of one or more normally-on switches, which then may be adapted for turning the normally-on switches off, such that the input of the converter cell is not short-circuited anymore and is interconnected with the cell capacitor. After that, the cell capacitor may be charged from the electrical grid, the modular converter is connected to.

In general, a start-up of modular voltage source converters employing normally-on switches may be enabled with the method. However, the photovoltaic cell of a converter cell may be used for providing the controller with auxiliary power, when the cell capacitor of the converter cell cannot be used as power supply, which may be the case, when the converter cell has a failure.

According to an embodiment of the invention, the method further comprises: detecting a failure in a converter cell; radiating light on the photovoltaic cell of the failed converter cell and supplying the controller of the failed converter cell with a voltage from the photovoltaic cell, such that the controller continues operating without a power supply from the cell capacitor. In such a way, continuous auxiliary power may be provided to single converter cells in failure mode via the light-beam based wireless power transfer. For example in the case of a failure, the controller may be kept operating for monitoring and/or for operating a kill switch, which may continuously short-circuit the failed converter cell.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
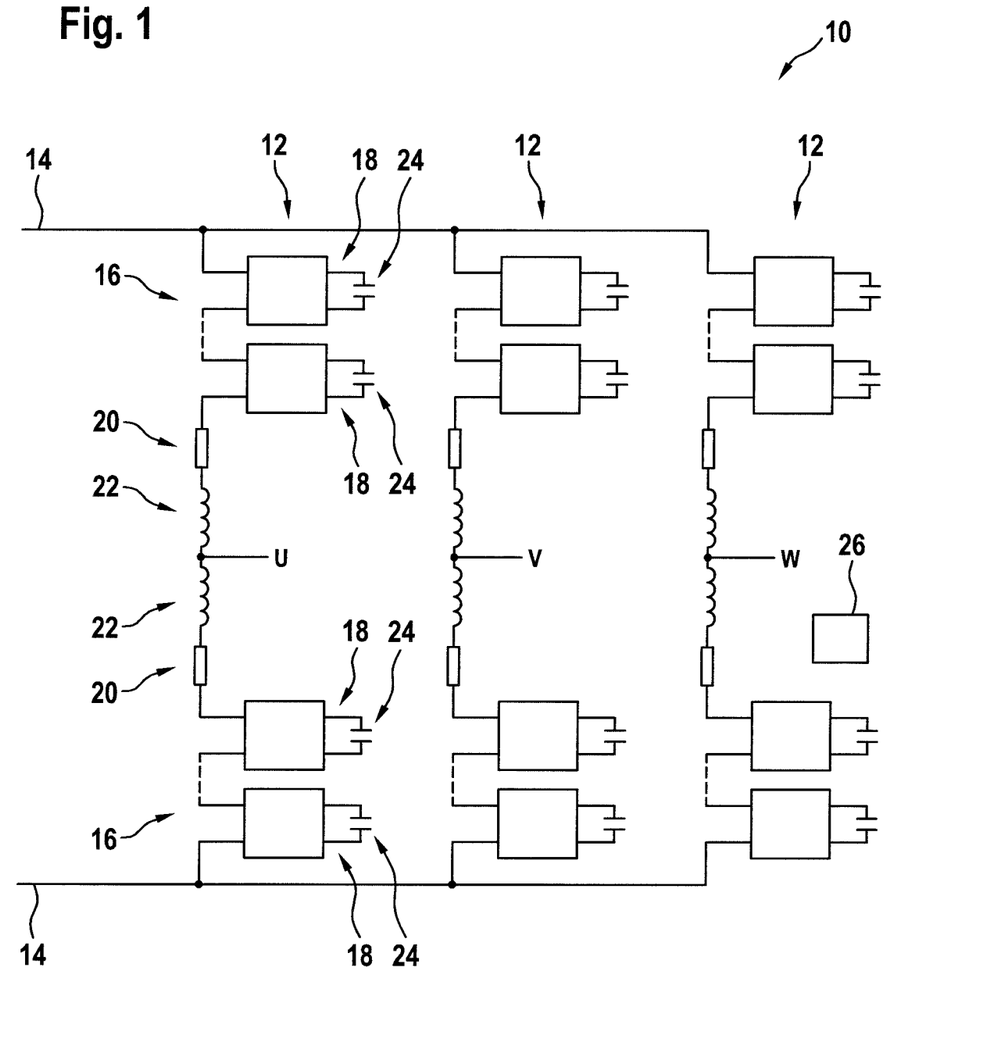
FIG. 1 schematically shows a circuit diagram of a modular converter according to an embodiment of the invention.

FIG. 1 shows a modular converter 10, which comprises three legs 12, each of which provides an output phase U, V, W at a middle point. The legs 12 are interconnected between two inputs 14 of the converter 10, at which a DC voltage is provided. In the case of HVDC applications, this voltage may be several 100 kV. Each leg 12 comprises two series-connected arms 16, each of which comprises a plurality of series-connected converter cells 18 and optionally a resistor 20 and/or an inductance 22, which interconnects the middle point of the leg with the converter cells 18.

As shown in FIG. 1, the converter 10 may be a multi-level converter and each converter cell 18 comprises a cell capacitor 24. A central controller 26 may control the converter cells 18 in such a way that the DC voltage between the inputs 14 is converted into an AC voltage provided in the output phases U, V, W and/or vice versa.

Figure 2:
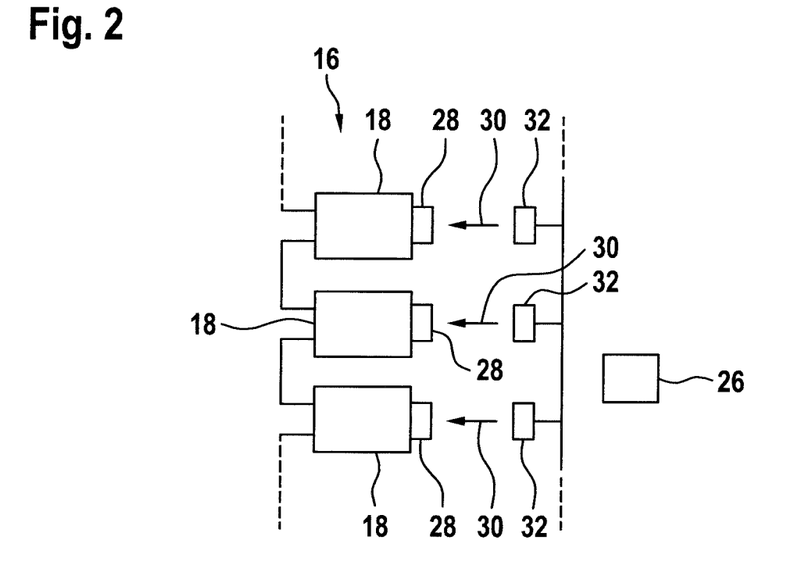
FIG. 2 schematically shows series-connected converter cells according to an embodiment of the invention.

FIG. 2 shows a part of an arm 16 of the converter 10. Every converter cell 18 comprises a photovoltaic cell 28 that, for example, is attached to a housing of the converter cell 18. When light 30 is radiated onto the photovoltaic cell 28, the photovoltaic cell 28 produces a voltage that may be supplied to the converter cell 18 and/or may be used for supplying the converter cell 18 with auxiliary power.

Usually, the series-connected converter cells 18 are provided in stacks in a hall, in which the converter 10 is arranged. These stacks need to be galvanically isolated with respect to the high voltages processed by the converter 10. Furthermore, during operation of the converter 10, each converter cell 18 is floating on an electrical potential that may be up to the maximal voltage processed by the converter 10. Also the respective photovoltaic cell 28, which is not galvanically isolated from the rest of the converter cell 18 with respect to this high voltage, is floating on this potential.

For radiating light 30 on one or more of the converter cells 18, artificial light sources 32 may be provided distant from the photovoltaic cells 28. The distance may be as high, such that the light sources 32 may be grounded. In such a way, a wireless power transfer may be performed via light 30 from the artificial light source 32, which may be controlled, such as switched on and off, by the central controller 26.

For example, the light sources 32 may be connected to a floor and/or a roof of the hall accommodating the converter 10. It has to be noted that the converter cells 18, the stack of converter cells 18 and/or the hall may have to be designed to allow beaming light 30 directly onto the photovoltaic cells 28.

Figure 3:
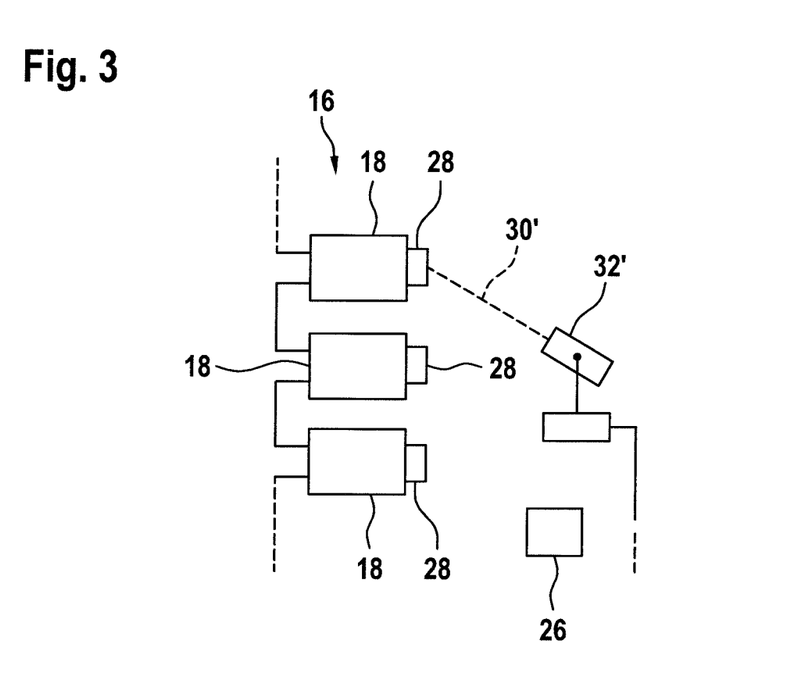
FIG. 3 schematically shows series-connected converter cells according to a further embodiment of the invention.
Figure 4:
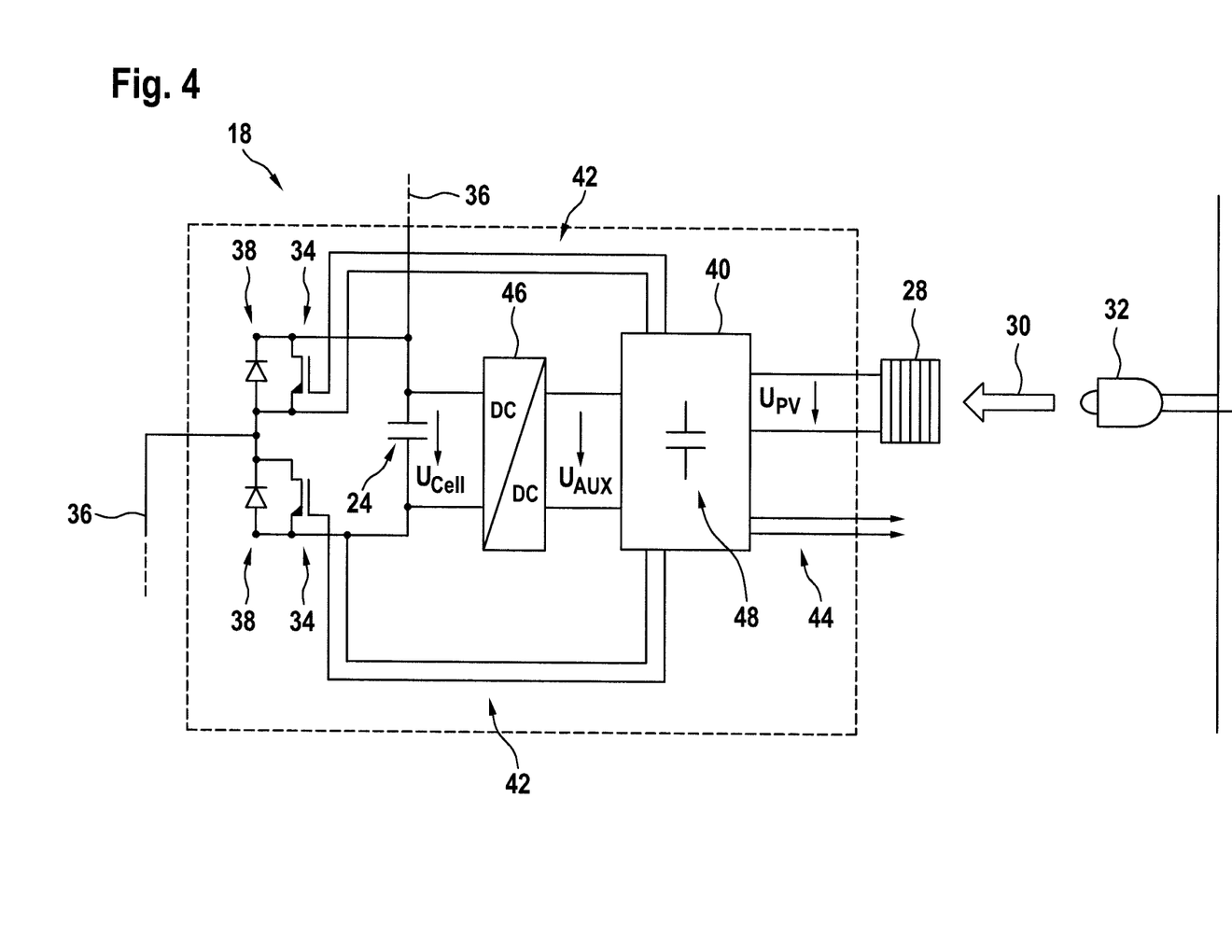
FIG. 4 schematically shows a circuit diagram of a converter cell according to an embodiment of the invention.

As shown in FIG. 2, the light sources 32 and/or the beam of light 32 generated by them may be fixed. FIG. 3 shows, that one or more light sources 32' (here a laser) may be movable in such a way that a beam of light (here a laser beam) 30' may be directed onto different converter cells 18 at different times. In such a way, light 30' may be radiated sequentially onto the converter cells 18. The movement of the light source 32' may be controlled by the central controller 26. FIG. 4 shows a converter cell 18 in more detail. The converter cell 18 comprises a cell capacitor 24, which is electrically connectable with semiconductor switches 34 between two outputs 36 of the converter cell 18. The semiconductor switches 34 are connected in series with each other and in parallel to the cell capacitor 24. One output 36 of the converter cell 18 is provided on an end of the series-connection and the other output is provided between the semiconductor switches 34. Furthermore, a free-wheeling diode 38 may be connected anti-parallel to each semiconductor switch 34.

As shown in FIG. 4, the semiconductor switches 34 may be IGBTs, i.e. normally-off devices. However, the semiconductor switches 34 also may be normally-off devices, such as SiC JFETs. Furthermore, the semiconductor switches 34 may be based on Si substrate or a wide bandgap substrate. For example, the semiconductor switches 34 may be SiC-JFETs, which may provide a rather high voltage blocking capability of more than 10 kV.

The converter cell 18 furthermore comprises a cell controller 40, which may comprise control electronics, sensors, gate drivers, etc. The cell controller 40 is adapted for providing the gate signals 42 for the semiconductor switches 34. Via a link 44, the cell controller may communicate with the central controller 26.

According to an aspect and suitable for a combination with any embodiments disclosed in this application, the cell controller 40 may further comprise a network interface for connecting the device to a data network, in particular a global data network. The data network may be a TCP/IP network such as Internet. The cell controller 40 is operatively connected to the network interface for carrying out commands received from the data network. The commands may include a control command for controlling the device to carry out a task such as bypassing the cell, health monitoring, documenting system status. In this case, the controller is adapted for carrying out the task in response to the control command. The commands may include a status request. In response to the status request, or without prior status request, the cell controller 40 may be adapted for sending a status information to the network interface, and the network interface is then adapted for sending the status information over the network. The commands may include an update command including update data. In this case, the cell controller 40 is adapted for initiating an update in response to the update command and using the update data.

A DC/DC converter 46, which is interconnected between the cell capacitor 24 and the cell controller 40, is adapted for converting the cell capacitor voltage $U_{CELL}$ of the cell capacitor 24 into an auxiliary voltage $U_{AUX}$ for the controller 40. The auxiliary power supplied to the controller 40 may be stored in an auxiliary power capacitor 48. Also the voltage $U_{PV}$ of the photovoltaic cell 28 may be supplied to the controller 40 and/or stored on the auxiliary power capacitor 48.

For example, the cell capacitor voltage $U_{CELL}$ may be about 3 kV and the auxiliary voltage $U_{AUX}$ may be about 24 V. Also, the voltage $U_{PV}$ of the photovoltaic cell 28 may be in this range, i.e. lower than 30 V.

During normal operation of the converter 10, the controller 40 is supplied by the cell capacitor 24 with auxiliary power. The controller 40 switches a cell current through the converter cell 18 by switching the one or more semiconductor switches 34 in such a way that the cell capacitor 24 is loaded. The cell capacitor voltage $U_{CELL}$ is converted by the DC/DC converter 46 into the supply voltage $U_{AUX}$ for the controller 40 and/or may be stored in the auxiliary power capacitor 48.

During normal operation, the photovoltaic cell 28 may be electrically disconnected from the controller 40. A protection mechanism, such as a diode, may be placed between the photovoltaic cell 28 and the controller 40, in order to disconnect the photovoltaic cell 28 after the converter cell 18 is pre-charged during normal operation.

During a start-up phase or during commissioning of the converter 10, the controller 40 may be supplied from the photovoltaic cell 28 and/or the auxiliary power capacitor 48 may be charged with the photovoltaic cell 28.

The light sources 32 may be switched on by the central controller 26 and light 30 may be radiated onto the photovoltaic cells 28.

In a start-up phase, when the auxiliary power capacitor 48 has been charged enough, the controller 40 may start operation. In the case of normally-on switches 34, the controller 40 may switch the switches 34 into a blocking state. After that, all converter cells 18 are blocking and a pre-charging of the cell capacitors 24 via the voltage at the inputs 14 of the converter may be started.

During commissioning or for a test, even the cell capacitors 24 may be charged via the photovoltaic cells 28. The DC/DC converter 46 may convert the voltage $U_{PV}$ from the photovoltaic cell 28 into a voltage supplied to the cell capacitor 24.

Furthermore, the auxiliary power from the photovoltaic cell 28 may be used in a failure operation mode of a converter module. In the case, when a failure is detected in a converter cell 18, for example with a sensor of the controller 40, this failure may be indicated to the central controller 26, which then may start to radiate light 30 on the specific converter cell 18. This may be performed as described with respect to FIG. 3.

Although the converter cell 18 may be shirt-circuited after the failure and/or the cell capacitor may be discharged, the controller 40 of the failed converter cell 18 may be supplied with a voltage from the photovoltaic cell 28, such that the controller 40 continues operating. For example, the controller 40 may continue to gather sensor data and may send this to the central controller 26.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS

10 modular converter
12 converter leg
14 input
U, V, W output phase
16 arm
18 converter cell
20 resistor
22 inductance
24 cell capacitor
26 central controller
28 photovoltaic cell
30 light/light beam
30' laser beam
32 light source
32' laser
34 semiconductor switch
36 output
38 free-wheeling diode
40 cell controller
42 gate signals
44 fibre optic line/link line
46 DC/DC converter
48 auxiliary power capacitor
$U_{CELL}$ cell capacitor voltage
$U_{AUX}$ auxiliary voltage
$U_{PV}$ photovoltaic cell voltage

The invention claimed is:

1. A converter cell for a modular converter, the converter cell comprising:
    at least one power semiconductor switch for switching a cell current through the converter cell;
    a cell capacitor interconnected with the at least one power semiconductor switch, such that the cell capacitor is loadable by the cell current;
    a controller for switching the at least one power semiconductor switch, wherein the controller is supplyable with auxiliary power from the cell capacitor; and
    a photovoltaic cell for providing further auxiliary power to the controller.

2. The converter cell of claim 1,
    wherein during operation of the converter cell, the photovoltaic cell is on an electric potential of the converter cell.

3. The converter cell of claim 2, further comprising:
    an auxiliary power capacitor for storing auxiliary power for the controller and for receiving auxiliary power from the cell capacitor and the photovoltaic cell.

4. The converter cell of claim 2, further comprising:
    a DC/DC converter for converting a cell capacitor voltage of the cell capacitor into a supply voltage for the controller.

5. The converter cell of claim 3, further comprising:
    a DC/DC converter for converting a cell capacitor voltage of the cell capacitor into a supply voltage for the controller.

6. The converter cell of claim 1, further comprising:
    an auxiliary power capacitor for storing auxiliary power for the controller and for receiving auxiliary power from the cell capacitor and the photovoltaic cell.

7. The converter cell of claim 6, further comprising:
    a DC/DC converter for converting a cell capacitor voltage of the cell capacitor into a supply voltage for the controller.

8. The converter cell of claim 1, further comprising:
    a DC/DC converter for converting a cell capacitor voltage of the cell capacitor into a supply voltage for the controller.

9. The converter cell of claim 8,
    wherein the DC/DC converter is adapted for converting a voltage from the photovoltaic cell into a voltage supplied to the cell capacitor.

10. The converter cell of claim 1,
    wherein the at least one power semiconductor switch is a normally-on switch.

11. The converter cell of claim 1,
    wherein the at least one power semiconductor switch is based on a wide bandgap substrate.

12. The converter cell of claim 1,
    wherein the cell controller comprises a network interface for connecting the device to a data network,
    wherein the cell controller is operatively connected to the network interface for carrying out commands received from the data network and/or sending device status information to the data network.

13. A method for operating a modular converter comprising a plurality of converter cells connected in series, each of the converter cells including at least one power semiconductor switch for switching a cell current through the converter cell, a cell capacitor interconnected with the at least one power semiconductor switch, such that the cell capacitor is loadable by the cell current, a controller for switching the at least one power semiconductor switch, wherein the controller is supplyable with auxiliary power from the cell capacitor, a photovoltaic cell for providing further auxiliary power to the controller, and at least one light source, which is galvanically separated from the converter cells and which is adapted for radiating light on one or more of the photovoltaic cells of the converter cells, the method comprising:
    radiating light on photovoltaic cells of the converter cells;
    supplying the controllers of the converter cells with a voltage from the photovoltaic cells.

14. The method of claim 13,
wherein the semiconductor switches of the converter cells comprise normally-on switches and the method further comprises:
radiating light on the photovoltaic cells during a start-up of the converter;
switching the at least one normally-on switch of a converter cell into a blocking state with the controller of the converter cell, which is supplied by the photovoltaic cell.

15. The method of claim 13, further comprising:
detecting a failure in a converter cell;
radiating light on the photovoltaic cell of the failed converter cell and supplying the controller of the failed converter cell with a voltage from the photovoltaic cell, such that the controller continues operating without a power supply from the cell capacitor.

16. A modular converter, comprising:
a plurality of converter cells connected in series, the converter cell comprising;
at least one power semiconductor switch for switching a cell current through the converter cell,
a cell capacitor interconnected with the at least one power semiconductor switch, such that the cell capacitor is loadable by the cell current,
a controller for switching the at least one power semiconductor switch, wherein the controller is supplyable with auxiliary power from the cell capacitor,
a photovoltaic cell for providing further auxiliary power to the controller, and
at least one light source, which is galvanically separated from the converter cells and which is adapted for radiating light on one or more of the photovoltaic cells of the converter cells.

17. The modular converter of claim 16, further comprising:
a plurality of light sources, wherein every light source is associated with one or more photovoltaic cells.

18. The modular converter of claim 17, wherein the at least one light source comprises a laser.

19. The modular converter of claim 16,
wherein the at least one light source comprises a laser.

20. The modular converter of claim 16, further comprising:
at least one movable light source, such that converter cells and/or groups of converter cells are supplyable sequentially with at least one movable light source.

* * * * *